(12) United States Patent
Kellers et al.

(10) Patent No.: US 7,531,750 B2
(45) Date of Patent: May 12, 2009

(54) POWER SUPPLY LINE FOR CRYOGENIC ELECTRICAL SYSTEMS

(75) Inventors: Jürgen Kellers, Haltern (DE); Thomas Braun, Ettringen (DE); Jan Wiezoreck, Bonn (DE)

(73) Assignee: Zenergy Power GmbH, Rheinbach (DE)

( * ) Notice: Subject to any disclaimer, the term of this patent is extended or adjusted under 35 U.S.C. 154(b) by 360 days.

(21) Appl. No.: 11/633,617

(22) Filed: Dec. 5, 2006

(65) Prior Publication Data

US 2007/0144765 A1     Jun. 28, 2007

(30) Foreign Application Priority Data

Dec. 5, 2005    (DE) ................ 10 2005 058 029

(51) Int. Cl.
*H01B 12/00* (2006.01)
(52) U.S. Cl. .................... 174/125.1; 505/230
(58) Field of Classification Search ........... 174/15.4, 174/15.5, 125.1; 505/230–232
See application file for complete search history.

(56) References Cited

U.S. PATENT DOCUMENTS 6,512,311 B1 *   1/2003   Metra et al. ............... 307/147
6,525,265 B1 *   2/2003   Leijon et al. ............. 174/15.5

FOREIGN PATENT DOCUMENTS

WO      WO 00/14827 A1     3/2000

\* cited by examiner

*Primary Examiner*—Jeremy C Norris
(74) *Attorney, Agent, or Firm*—Edell, Shapiro & Finnan, LLC

(57) ABSTRACT

A power supply line for connecting a superconducting consumer system to a current delivery point, which is at a higher temperature than the consumer system, includes a carrier and a plurality of band-shaped, mechanically and electrically parallel high-temperature superconductors (HTSL). To achieve a high critical current density with simultaneously low heat-conducting capacity of the power supply line, the carrier includes at least one elongated plate that includes a sparingly (low) heat-conducting material, with a ratio of width to thickness of at least 3:1 and band-shaped HTSL that are arranged parallel adjacent to one another on the carrier. Each band-shaped HTSL also has a normally conducting current path.

13 Claims, 3 Drawing Sheets

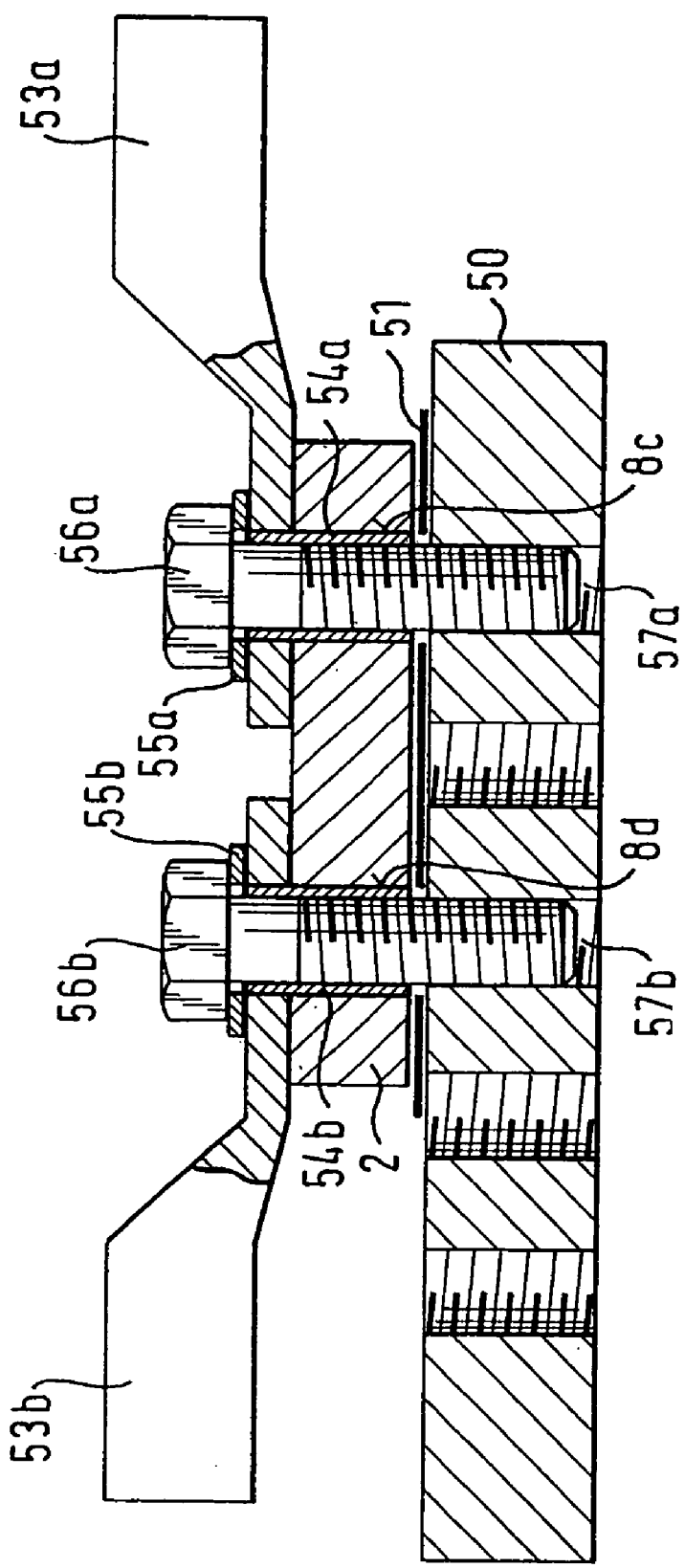

POWER SUPPLY LINE FOR CRYOGENIC ELECTRICAL SYSTEMS

CROSS REFERENCE TO RELATED APPLICATIONS

This application claims priority under 35 U.S.C. §119 to Application No. DE 102005058029 filed on Dec. 5, 2005, entitled "Power Supply Line for Cryogenic Electrical Systems," the entire contents of which are hereby incorporated by reference.

BACKGROUND

WO 00/14827 A1 discloses a power supply line for connecting a superconducting consumer system to a power delivery point. For mechanical attachment and electrical contacting of the plate or the HTSL, the ends of the plate are inserted into corresponding recesses of the connectors. Then, the recesses are filled with solder. As a result, not only good electrical contacting but also good heat conduction between the parts that are connected to one another is provided.

A superconducting power supply line, in which the band-shaped high-temperature superconductors are assembled into a stack and these stacks are mounted parallel to the axis of the carrier on the shell of an approximately cylindrical carrier, is known from U.S. Pat. No. 6,034,324. This power supply line has the drawback that the critical current density of an individual band-shaped superconductor is not achieved in the composite since the magnetic fields of the current-carrying superconductor, in particular because of the dense packing, are superposed in an additive manner. Moreover, the production of the stack is cost-intensive because of the necessary soldering or sintering steps.

SUMMARY

The invention provides a power supply line for connecting a superconducting consumer system to a current delivery point, which connects a high critical current density to a good heat insulation between the consumer system and the delivery point and can be produced economically. More specifically, the invention provides a power supply line for connecting a superconducting consumer system to a power delivery point, which is at a higher temperature than the consumer system and that comprises a carrier with one connector each on each end of the carrier and multiple band-shaped, mechanically and electrically parallel high-temperature superconductors (HTSL). The carrier is made of an elongated plate that comprises a sparingly (i.e., low) heat-conducting material. The HTSL are arranged parallel adjacent to one another on the plate. Each HTSL comprises a normally conducting current path.

The power supply line has a carrier that comprises at least one elongated plate that comprises a sparingly (low) heat-conducting material and has a ratio of width to thickness of at least 3:1, on which the band-shaped HTSL are arranged parallel adjacent to one another and which comprise one normally conducting current path each.

Since the carrier comprises an elongated, preferably essentially flat plate that includes a sparingly heat-conducting material, good heat insulation is ensured. Since the band-shaped HTSL are arranged on the plate in longitudinal direction parallel adjacent to one another, a high critical current density is reached, since the magnetic fields of further removed HTSL do not drop in weight since the magnetic field strength decreases with $1/r^2$. The reliability of the power supply line is increased by the additional, normally conducting current path.

To put the consumer system into operation, it first is cooled. In this case, at least the end of the power supply line facing the consumer system is cooled to approximately the temperature of the consumer system. If the material of the carrier has approximately the same heat expansion coefficient as the band-shaped HTSL, shear stresses between HTSL and carriers are avoided. Such shear stresses would result in an undesired bending or a stretching of the power supply line and in the extreme case even to detaching the band-shaped HTSL from the carrier.

An especially suitable material for the carrier plate is glass-fiber-reinforced plastic (GFK), since GFK is both a good electrical insulator and a heat insulator.

The band-shaped HTSL can be arranged between the first plate and a second, similar plate. The thus produced sandwich structure is mechanically stable and in the case of electrically insulating plates, the parallel band-shaped HTSL are protected from short-circuiting by contact, e.g., with a housing part.

If the plate or the plates are connected mechanically on each of their ends to one normally conducting connector each, and the band-shaped HTSL are contacted electrically with the connectors, a both mechanically and electrically reliable connection with the consumer system and the respective current delivery point can be produced via the respective connector. The connectors connect the band-shaped HTSL parallel to one another and by their platform offer sufficient space for the connection also of multiple cross-sectionally strong, normally conducting copper cables or strands.

If the band-shaped HTSL are connected directly to the superconducting consumer system, no heat to be dissipated is produced by the ohmic resistance in normal conductors. The direct connection can comprise an HTSL or BCS connector, for example.

The electrical contacting can be embodied as a solder joint. This ensures reliable contacting even at low temperatures. Moreover, solder joints can be produced economically.

The power supply line is preferably cooled on its two ends via one cooling device each. The cooling device on the warmer end keeps the latter at a temperature of between about 50 and about 100 K. This temperature range is adequate for safe operation of many HTSL. The colder end of the power supply line is cooled to a temperature of <35 K, preferably <12 K. At these temperatures, some low-temperature superconductors, such as NbTi or Nb3Sn, are already superconducting.

The band-shaped HTSL can be multifilament conductors or thin-layer HTSL, so-called coated conductors, produced according to the powder-in-pipe process (PIT). In the latter case, each band-shaped HTSL especially advantageously comprises two thin-layer HTSL that are arranged as a mirror image to the neutral fibers.

The power supply line can be coated at least partially with a polymerizing plastic, e.g., polyethylene (PE), polyurethane (PU) or polypropylene (PP) for protection and for electrical insulation.

The normally conducting current path of the band-shaped HTSL can be, e.g., a metal shunt that is applied to a thin-layer HTSL or the metal portion of a multifilament conductor that is produced according to the PIT process.

The metal current path preferably comprises metals or a metal alloy whose heat conductivity decreases with dropping temperature.

For the PIT process, for example, silver or a silver alloy can be used. The metal current path of thin-layer conductors is preferably made of copper or gold. A silver alloy with a gold doping of about 3% to about 10%, in particular about 4.6% by weight, is especially suitable. At a temperature of below about 20 K, the heat conductivity drops by the gold doping by about two orders of magnitude, without the electrical current load-carrying capacity being significantly changed.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

Below, the invention is described in connection with exemplary embodiments that are depicted in the drawings.

FIG. 5 shows a detail of the power supply line in section.

DETAILED DESCRIPTION

Figure 1:
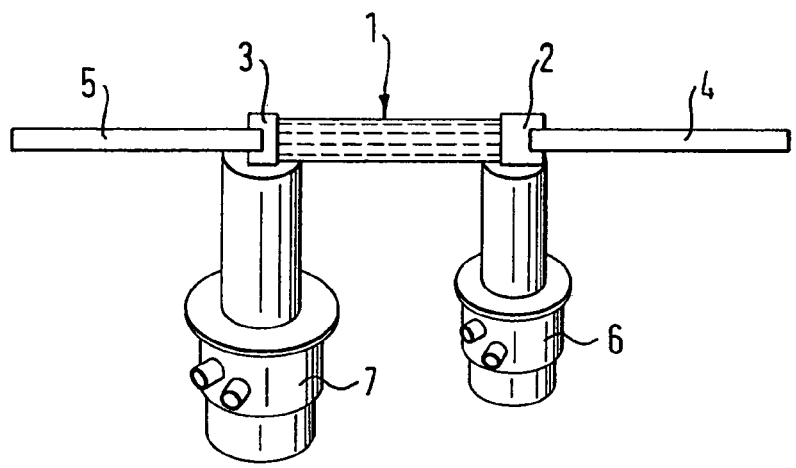
FIG. 1 shows a diagrammatic, simplified depiction of a power supply line.

FIG. 1 shows a power supply line 1 for connecting a superconducting consumer system, at a temperature of, e.g., between 1 K and 30 K, to a current delivery point at room temperature. A metal conductor 4 bridges the temperature difference between the current delivery point, not shown, and a first connector 2, which is kept by a first refrigerating machine 6 at a temperature of about 60 K up to about 70 K. The power supply line 1 bridges the temperature difference up to a second connector 3, which is kept by a second refrigerating machine 7 to a temperature of about 1 K up to about 30 K. A metal conductor or a superconductor 5 (HTSL or other low-temperature superconductor), which produces the connection to the superconducting consumer system, is detachable from the second connector 3. The refrigerating machines 6, 7 can be, e.g., evaporation coolers. Bridges to cold radiation shields are also suitable. If the temperature of the superconducting consumer system is approximately the same as the temperature of the second connector 3, the refrigerating machine 7 may be unnecessary.

Figure 2A:
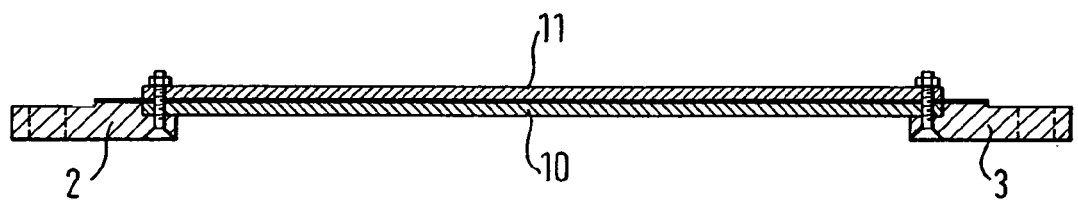
FIG. 2a shows a side view of the power supply line according to FIG. 1.
Figure 2B:
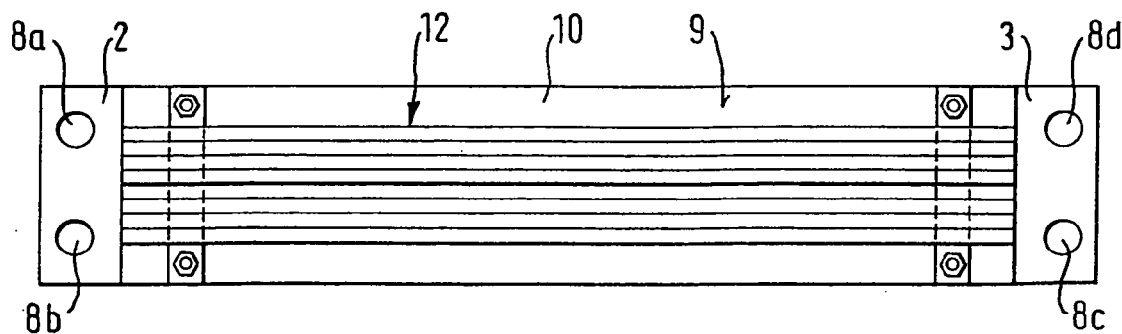
FIG. 2b shows a top view of the same power supply line.

FIG. 2a shows the power supply line 1 according to FIG. 1 in the side view, FIG. 2b in the top view, but without an upper carrier plate. The power supply line 1 comprises an elongated, flat GFK carrier 10, which is inserted with its two ends in each case into a recess of an otherwise parallelepiped-shaped connector 2 or 3. The connectors 2, 3 are flat on their bottom side to make possible good heat dissipation by refrigerating machines. The top side of the GFK carrier 10 forms a flat surface 9 with the top sides of the connectors 2, 3. In each case, band-shaped HTSL 12 that are parallel to one another lie on this flat surface 9. The band-shaped HTSL are connected in an electrically conducting manner on their two ends in each case to one of the connectors 2, 3. An upper GFK carrier 11 (shown only in FIG. 2a), which is gibbed together with the carrier 10 to the connectors 2, 3, is on the band-shaped HTSL 12. The upper carrier 11 protects the band-shaped HTSL 12 from mechanical damage and at the same time improves the mechanical resistance of the power supply line 1. To fasten the power supply line 1, e.g., to the refrigerating machines 6, 7 (see FIG. 1) and the metal conductor 4 or the superconductor 5, holes 8a, 8b, 8c and 8d are provided.

Figure 3:
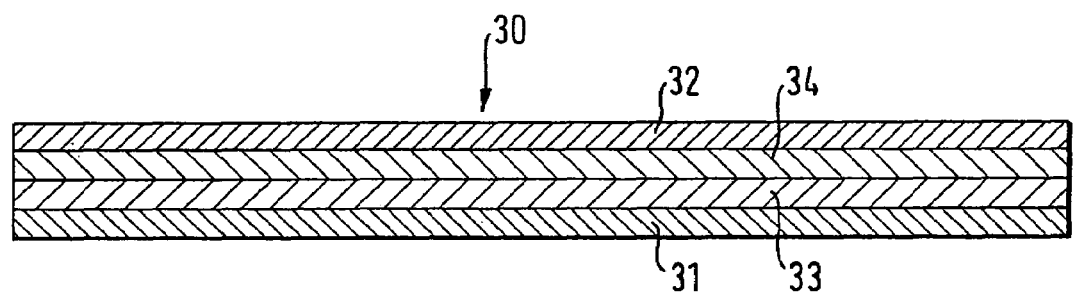
FIG. 3 shows a thin-layer HTSL.

FIG. 3 shows one of the band-shaped thin-layer HTSL 12 in longitudinal section. The thin-layer HTSL comprises a substrate 31, on which a buffer layer 33 is applied. An HTSL layer 34 that comprises ReBCuO, whereby Re stands for a rare earth metal, for example yttrium, is on the buffer layer 33. A normally conducting (shunt) metal layer 32 is on the HTSL layer 34. To increase the electrical conductivity with simultaneous reduction of the heat conductivity, the metal layer 32 is doped with about 4% gold.

Figure 4:
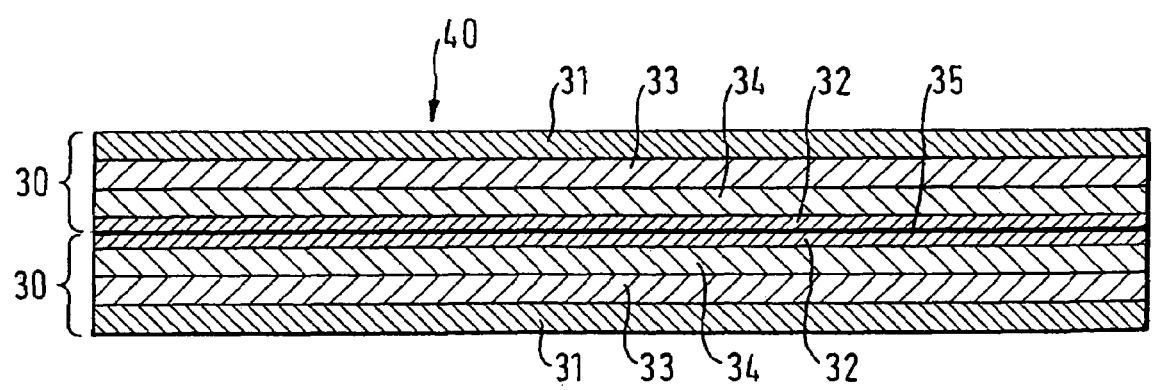
FIG. 4 shows a composite that comprises two thin-layer HTSL.

FIG. 4 shows a composite 40 that comprises two thin-layer HTSL 30 according to FIG. 3, which are stacked and whose inside metal layers 32 are connected in a conducting manner by a solder layer 35. The neutral fiber is in the solder layer 35.

The use of such "neutral fiber conductors" is then advantageous if the power supply line is curved, since then only slight tensile forces and compressive forces act on the HTSL layers. In particular, tensile forces could otherwise result in microcracks that compromise conductivity in the HTSL layers. Since the two substrate layers 31 lie below or above, i.e., are outside layers, the metal layers 32 and the HTSL layers 34 are protected from mechanical damage to a great extent. The buffer layers 33 are non-conducting, by which the substrate layers 31 are insulated from the electrically conducting layers 32, 34.

FIG. 5 shows an enlarged section through one of the connecting areas of the power line in FIGS. 2a, 2b. The connector 2 of the power supply line lies on a carrier 50, which is connected to a refrigerating machine (not depicted). An insulating layer 51, for example made of kapton, which electrically insulates the carrier 50 and the connector 2 from one another but at the same time produces a good heat connection, is between the connector 2 and the carrier 50. The power supply line is connected to the current delivery point via two copper cables (not depicted), which in each case end in a terminal 53a and 53b. The terminals 53a and 53b are flush with the connector 2 and are secured with one screw 56a and 56b each. The screws 56a and 56b in each case penetrate a terminal 53a and 53b, the holes 8d and 8c of the connector 2 as well as the insulating layer 51. The threads of the screws 56a and 56b engage in one threaded hole 57a and 57b each in the carrier 50. The screws 56a and 56b are electrically insulated by one insulating sleeve 54a and 54b each as well as one insulating disk 55a and 55b each of the connector 2 and the terminals 53a, 53b.

Having described exemplary embodiments of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A power supply line for connecting a superconducting consumer system to a current delivery point, which is at a higher temperature than the consumer system, comprising:

a carrier with first and second connectors respectively disposed on first and second ends of the carrier, the carrier comprising at least one elongated plate that includes a low heat-conducting material, wherein a top side of the plate forms a flush surface with top sides of the connectors; and a plurality of band-shaped, mechanically and electrically parallel high-temperature superconductors (HTSL) arranged parallel adjacent to one another on the carrier, each band-shaped high-temperature superconductor comprising a normally conducting current path.

2. The power supply line according to claim 1, wherein the carrier further comprises a second plate, the band-shaped HTSL being arranged between the plate and the second plate.

3. The power supply line according to claim 1, the first and second connectors are electrically conducting and are mechanically connected to the plate such that the band-shaped HTSL are in electrical contact with the first and second connectors.

4. The power supply line according to claim 3, wherein at least one of the first and second connectors comprises a BCS or HTSL material.

5. The power supply line according to claim 3, wherein the electric contact between the band-shaped HTSL and at least one of the first and second connector is a solder joint.

6. The power supply line according to claim 1, wherein the power supply line is connected on a warmer end to a first cooling device that keeps the warmer end at a temperature in the range of about 50 to 100 K, and on a cooler end to a second cooling device that keeps the warmer end at a temperature of <35 K.

7. The power supply line according to claim 1, wherein the power supply line is connected on a warmer end to a first cooling device that keeps the warmer end at a temperature in the range of about 50 to 100 K, and on a cooler end to a second cooling device that keeps the warmer end at a temperature of <12 K.

8. The power supply line according to claim 1, wherein each of the band-shaped HTSL comprises a multifilament conductor produced according to the PIT process.

9. The power supply line according to claim 1, wherein the band-shaped HTSL are thin-layer coated conductors.

10. The power supply line according to claim 1, wherein the power supply line is coated at least on one side with a polymerizing plastic.

11. The power supply line according to claim 10, wherein the polymerizing plastic includes at least one of: PE, PU, and PP.

12. The power supply line according to claim 1, wherein the normally conducting current path comprises a band-shaped HTSL including a metal or a metal alloy with a heat conductivity that decreases with decreasing temperature.

13. The power supply line according to claim 1, wherein the normally conducting current path comprises a band-shaped HTSL including a metal or a metal alloy.

* * * * *